United States Patent

Lemelson

[15] 3,692,892

[45] Sept. 19, 1972

[54] CASTING AND MOLDING METHOD

[72] Inventor: Jerome H. Lemelson, 85 Rector St., Metuchen, N.J. 08840

[22] Filed: Feb. 24, 1969

[21] Appl. No.: 801,430

Related U.S. Application Data

[63] Continuation-in-part of Ser. No. 304,165, Aug. 23, 1963, Pat. No. 3,427,714.

[52] U.S. Cl.................................................264/317
[51] Int. Cl................................................B29c 1/08
[58] Field of Search..........264/317, 49, 59, DIG. 44; 164/35, 36, 44, 125, 126; 18/6, 38; 249/62, 79, 80

[56] References Cited

UNITED STATES PATENTS 3,136,831    6/1964    Zinn..........................264/317
3,226,785    1/1966    Moxlow et al...............164/36

*Primary Examiner*—Robert F. White
*Assistant Examiner*—J. R. Hall

[57] ABSTRACT

A casting and molding method is provided employing one or more hollow members disposed in a mold to provide a core for hollow molding. In one form, heat transfer liquid is predeterminately circulated through the hollow core member during the molding process and serves a number of functions including reduction in the time for the molding to set, prevention of destruction of the core member by heat and, in certain instances, internal support for the core member during molding. Automatic control means are provided for controlling both the molding procedure and the flow of heat transfer fluid through the core member. The method, with minor variations, is applicable to both casting and injection molding of various materials such as metals which are molded at high temperature and require the transfer of heat therefrom or thermosetting materials which require heat to be transferred to the molding material during the molding and setting procedure.

The instant invention is also concerned with certain post molding procedures associated with moldings containing hollow core members such as means for removing the core members by dissolving or eroding the material thereof.

4 Claims, 5 Drawing Figures

PATENTED SEP 19 1972 3,692,892
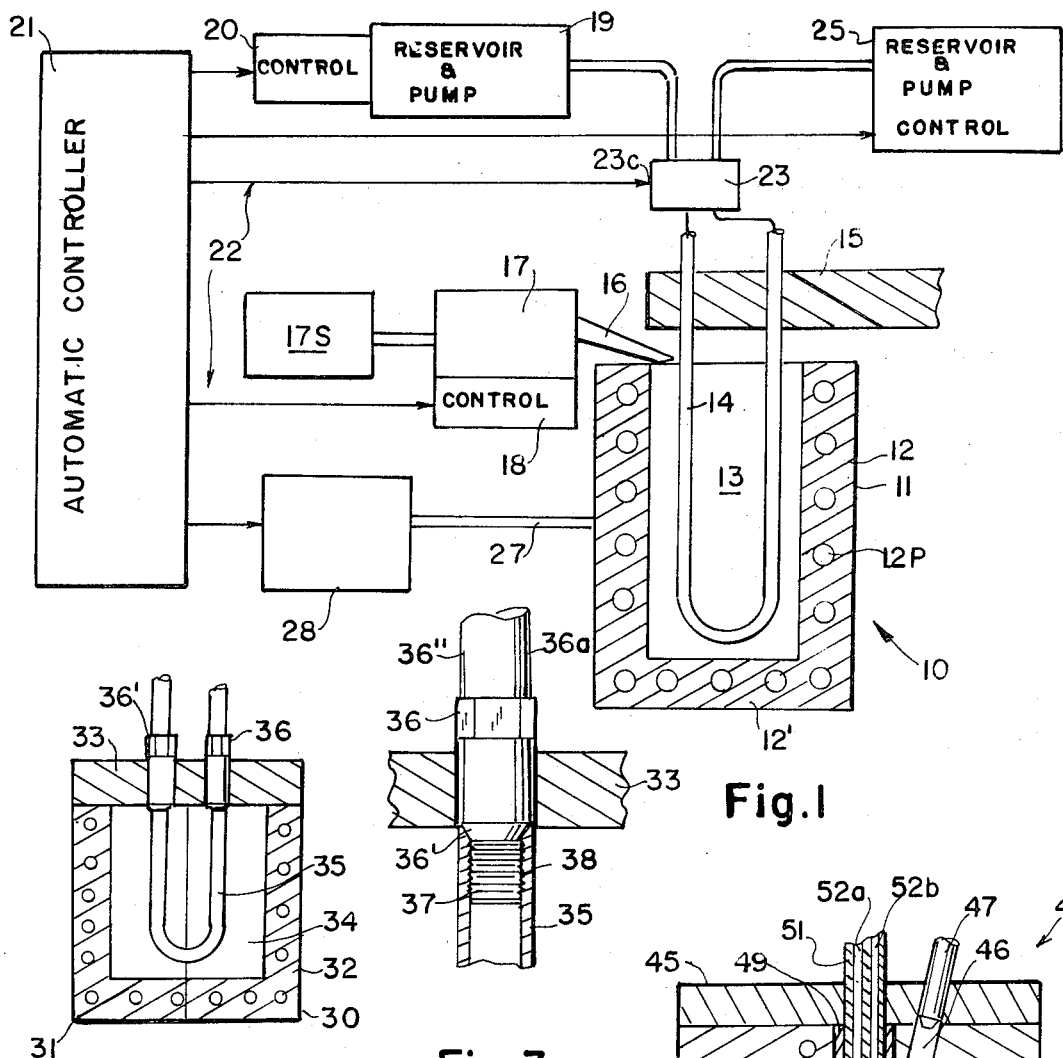
Fig.1
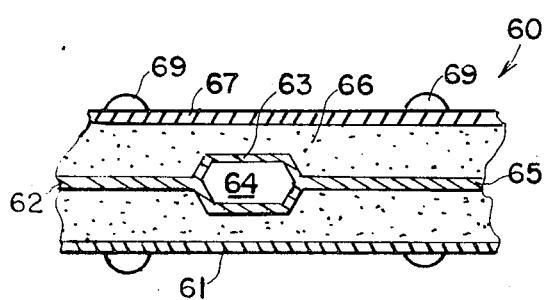
Fig. 2
Fig.3
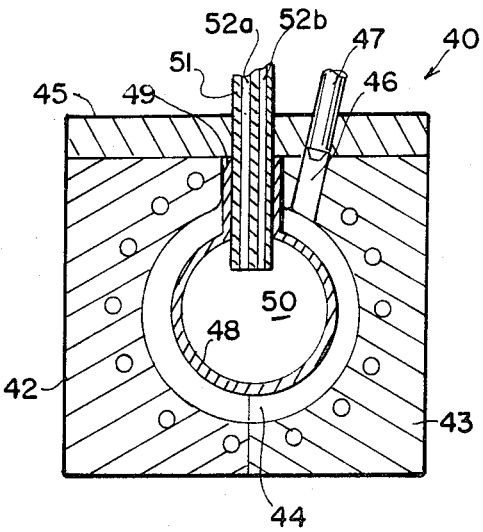
Fig.4
Fig. 5
INVENTOR.
JEROME H. LEMELSON

CASTING AND MOLDING METHOD

Related Applications

This is a continuation-in-part of copending application Ser. No. 304,165 filed Aug. 23, 1963, for Ducted Panel Fabrication now U.S. Pat No. 3,427,714 having as parent applications Ser. No. 589,300 filed June 4, 1956, now abandoned and Ser. No. 589,848 filed May 28, 1956, now U.S. Pat. No. 3,166,829.

SUMMARY OF THE INVENTION

This invention relates to method for producing hollow moldings such as metal castings or injection moldings containing one or more passageways or cavities disposed within the molding. In particular, this invention relates to a technique for molding hollow objects by inserting a hollow member such as a thin-walled tube or other shape in the cavity of a mold, predeterminately positioning and retaining said hollow shape in the mold while pouring or injecting a molten molding material into the mold cavity so as to partially or completely surround the hollow member and define, upon the setting of said molding material, a hollow molded shape.

It is known in the art to produce hollow castings by disposing a destructible core member within a mold and casting molten metal thereabout. Metal has been case in sand molds, for example, containing a core member made of sand or other material which is crumbled or pulverized after the object is molded to shape and removed from the center of the object. The so-called lost-wax process involves molding metal about a wax preform which is melted away thereafter to provide a hollow object. These procedures have certain shortcomings which make then undesirable for the molding of certain materials and articles.

It is, accordingly, a primary object of this invention to provide a new and improved method for molding hollow articles.

Another object is to provide a method for molding hollow articles having interior surfaces which are precisely shaped.

Another object is to provide a method for molding metal at high temperature with one or more core members disposed in the molding during the molding procedure and precisely defining the wall thickness of the molding.

Another object is to provide a method for forming metal moldings having passageways or conduits extending therethrough for the flow of heat transfer fluid.

Another object is to provide a method for molding hollow articles by disposing a hollow member within a mold and predeterminately flowing heat transfer fluid through said hollow member during the molding procedure to rapidly transfer heat from the molding material and protect the hollow member form heat destruction.

Another object is to provide an improved method for molding metal at high temperature and cooling same by transferring heat simultaneously from the exterior and interior of the hollow member.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawing:

FIG. 1 is a side view with parts sectioned for clarity of a molding apparatus showing features of the invention and a control system therefore; FIG. 2 is a side view with parts sectioned for clarity of a modified form of the molding apparatus of FIG. 1;

FIG. 3 is a side view with parts sectioned for clarity of certain of the components of FIG. 2;

FIG. 4 is a side view with parts sectioned for clarity of a modified form of the molding apparatus of FIG. 2 employing a hollow, thin-walled core member; and FIG. 5 is an end view in cross section of an article of manufacture producible by apparatus of the type defined herein.

Referring now to the drawings, there is shown in FIG. 1, a molding apparatus 10 including a mold 11 having a circumscribing side wall 12 and bottom wall 12' defining a molding cavity 13. The mold 11 is preferably made of a plurality of parts which are separable from each other though not illustrated in FIG. 1 so as to permit the molding formed in the cavity 13 to be removed upon separation of said mold parts. While the mold 11 is shown as open at top defining a casting mold, it may also be totally enclosed as shown in FIG. 2 and may contain one or more devices (not shown) attached to the walls of the mold for rapidly opening and closing the mold in accordance with known molding machinery construction.

Extending through the walls of the mold 11 are one or more passageways defined by notation 12P for circulating a heat transfer fluid therethrough and connected to the passageway 12P is piping 27 which extends to a pump and reservoir for heat transfer fluid defined by notation 28. The apparatus 28 may include means for removing heat from a mold coolant fluid such as water or other liquid or merely means for continuously pumping a fresh supply of water through the mold passageway 12P.

Shown disposed within the mold cavity 13 is a hollow core member 14 which, in its simplest form, may comprise a U-shaped tube as shown or may also comprise any other tubular or hollow shape which is held within the mold cavity and predeterminately located by a retaining means 15 supported exterior of the mold as shown. The retainer 15 may comprise a clamping fixture for releasably holding the hollow core member 14 during the molding procedure and operative to release its grip on same after molding and prior to removing the molded article from the mold. The ends of the hollow core member 14 are shown extending to respective two-position solenoid operated valves or gates 23 and 24 for selectively circulating two different fluids through the hollow core member 14 will be described hereafter.

Molding material is poured or injected into the cavity 13 through a nozzle 16 extending from a source 17s of molding material connnected to a flow controller 17 such as a solenoid operated valve or other means for controlling the flow of said molding material from the supply thereof. An electrically operated controller 18 controls the flow of molding material to the mold by controlling the valve or gating means 17 in accordance with control signals transmitted to the controller 18. Notation 19 refers to a pump and reservoir of heat transfer fluid to be flowed through the core hollow core member 14 during the molding procedure. The pump of unit 19 is operatively controlled by a pump control unit 20 which in turn, is controlled by signals generated by an automatic controller 21.

The automatic controller 21 may comprise a multi-circuit, self-recycling timer of the electronic or electromechanical type, a computer or any device operative to generate a series of control signals for controlling the various devices associated with the molding apparatus described herein. The automatic controller 21 may be operative, without feedback, by sequentially generating control signals on a plurality of outputs 22 thereof which extend to the controls of the various pumps, valves and other servos necessary to effect the operation of the apparatus 10 during an automatic molding cycle. In more sophisticated forms of the apparatus 10, feedback signals may be generated by temperature and flow-sensing devices located in the mold wall, mold cavity or any of the passageways through which molding material or heat transfer fluid is flowed. Said feedback signals may be utilized in respective feedback control loops for predeterminately varying and correcting the operation of pump motors, valve motors or actuators or molding material flow gates.

During a typical molding or casting cycle, molding material is predeterminately controlled in its flow through nozzle 16 into the mold cavity 13 by the automatic controller 21 generating control signals and feeding said control signals to the controller 18 for the gate, valve or servo operated means located in the molding material flow controller 17 to predeterminately control the rate-of-flow and quantity of molding material dispensed through the nozzle 16 into the mold cavity. Simultaneously with the flow of molding material into the mold cavity, the pump controller 20 receives a signal form the automatic controller 21 and controls the operation of the pump located in the heat transfer fluid unit 19 so as to flow heat transfer fluid through the hollow core member 14 at such a rate so as to predeterminately remove heat from the walls of the hollow core member 14. If the molding material is metal such as steel, aluminum, copper or other material, the hollow core member 14 may be made of the same metal or another metal having a wall thickness which is such that it may be warped, heat corroded, melted or otherwise damaged or destroyed during the molding procedure from the heat of the molding material.

Accordingly, by case properly flowing the heat transfer fluid through the hollow member 14 during the molding procedure, as controlled by the automatic controller 21, a number of important advantages are derived, viz:

a. The hollow core member 14 may be prevented from being destroyed if it is of such a material and wall thickness that the heat of the molding matter will effect its destruction during molding.

b. The hollow core member 14 may be prevented form warping or distorting during the molding procedure.

c. The interior and/or exterior of the hollow core member 14 may be prevented from being subjected to harmful heat corrosion during the molding procedure.

d. If fluid is flowed into the hollow core member 14 under pressure, the fluid pressure may be operative to support the walls of the hollow core member 14 against buckling due to external pressure during the molding procedure.

e. If the molding material is cast or molded at high temperature, lower temperature heat transfer fluid flowed through the hollow core member 14 may be operative to cooperate with the coolant flowed through the passageway 12P in the mold wall so as to more rapidly solidify the molding permitting it to be removed from the mold sooner than would ordinarily be possible by just coding the walls of the mold.

Also shown in FIG. 1 is a second unit 25 containing a pump and reservoir for a second fluid to be flowed through the passageway defined within the hollow core member 14. For example, said second fluid may serve one or more functions including (a) cleaning the interior of the hollow core member 14 to remove scale or other impurities provided or deposited therein during the aforedescribed molding procedure; (b) removing the material of the hollow core member 14 by dissolving same after the molding has solidified; (c) removing the material of the hollow core member 14 which has been charred or otherwise reduced by the heat of the molding operation. Suitable solenoid operated valves each have respective control inputs which are connected to the automatic controller 21 to permit said automatic controller to predeterminately operate said valves to permit the flow of fluid from the unit 25 to be initiated after the flow of heat transfer fluid from unit 19 has been terminated and to terminate the flow of either of said fluids upon the completion of the operation thereof as described. During the portion of a cycle in which it is required to transfer heat from the walls of the mold 11, the pump motor in coolant supply unit 28 is predeterminately controlled by a signal or signals generated by the automatic controller 21 which is so programmed and/or operative in response to feedback signals as described, to effect a predetermined molding, heat transfer and core conditioning operations as described so as to predeterminately produce a hollow molded article.

FIG. 2 illustrates a mold assembly 30 which is a modified form of that shown in FIG. 1 and is operative in a molding apparatus containing components such as those shown in FIG. 1. The mold 30 is composed of a plurality of mold sections 31 and 32 having a lid or closure section 33 defining, when assembled as shown, a molding cavity 34 in which molding material is molded to shape. The hollow core member 35 of FIG. 2 is shown as a U-shaped tube which is removably secured to respective coupling members 36 and 36' which are secured to the lid 33 of the mold, thus predeterminately retaining the hollow core member 35 within the mold as shown. FIG. 3 illustrates means for removably retaining one end of the hollow member 35 and a similar means may also be provided to retain the other end of the tube in place. The coupling member 36 is composed of a tubular member of cylindrical shape having a tapered portion 36' extending to a threaded end portion 37 which is threadably received in threads 38 formed in the inside wall of the end of the hollow core member 35. The lower end portion 37 and the shank portion 36' of member 36 immediately thereabove rotates about the upper portion 36a of the coupling 36 so that the threaded end portion may be removed from coupling with the end of the tubular member 34 by rotation. The portion 36'' therefore extends beyond the upper surface of the mold lid 33 to permit it to be rotated so as to remove it from the molding. In the mold structure shown in FIG. 2, an injection means (not shown) is provided for injecting a molding material under pressure into the mold cavity 34 and said injection means is preferably controlled by a servo which is controlled by signals generated by the automatic controller 21.

In FIG. 4, a modified form of the mold of FIG. 2 is provided which includes a multiple-part mold composed of mold members 42 and 43 defining a pear-shaped cavity 44 and having a lid or end wall 45 secured to the upper end thereto to close said cavity. Extending through an opening in the lid is a conduit 51 composed of two chambers 52a and 52b for respectively conducting and receiving heat transfer fluid. The lower end of the conduit 51 is connected to a hollow, spherical-shaped member 48 defining the core of the molding cast in the cavity 44. The neck 49 of hollow member 48 is clampingly engaged around the end of conduit 51 between portions of the walls of the mold sections 42 and 43 as shown. Heat transfer fluid conducted from a reservoir as described through the passageway 52a in conduit 51 circulates rapidly through the interior of hollow member 48 and is removed from passageway 52b which extends either to a drain or a heat transfer system for removing the heat from said fluid prior to recirculating same through the passageway 52a.

The hollow member 48 may be composed of a number of different materials including metal, plastic or ceramic materials and may be formed by molding, casting, spinning, stamping and welding sheet material, etc. In one form, the hollow member 48 may be blow molded of a suitable polymer or even metal. If molded of a polymer, the member 48 may be destroyed during the molding procedure but only after the molding material has solidified within the mold cavity 44 to a degree such that it will not enter the volume 50 defined by the hollow member 48. Notation 47 refers to an injection nozzle disposed within an inlet passageway 46 in the wall of mold member 45 and communicating with the volume 44 surrounding the core member 48.

The embodiments of the invention hereinabove described, the heat transfer fluid may comprise a liquid provided at ambient temperature or at a reduced temperature as the result of refrigerating same or may comprise a suitable gas at ambient or reduced temperature, depending on the temperature and characteristics of the molding material and the physical characteristics of the hollow member through which said heat transfer fluid is flowed. For example, if the molding material is a metal or ceramic which is molded at high temperature such as aluminum, which is rendered molten in excess of 1,000° F. or steel which requires a temperature in excess of 2,200° F. to render it molten, then the heat transfer fluid may comprise a high-temperature, non-combustible liquid such as an inert oil such as Pydraul. The heat transfer fluid may also comprise a second metal having a lower melting temperature than the metal which is molded. In the event that the hollow core member is a plastic such as a thermosetting resin, which may char or ablate during the molding procedure, or a thermoplastic resin such as expanded polystyrene or non-cellular formations of other resins which are operative to be vaporized during the molding procedure, then the heat transfer fluid conducted therethrough during the initial stages of molding may be a gas such as air or refrigerated carbon dioxide which is operative to delay the destruction of the hollow core member sufficiently to prevent the molding material from flowing into that volume defined by the hollow core member or to control such flow. For such an operation, the use of a secondary fluid such as that provided by the unit 25 of FIG. 1 may be operative to dissolve or flush out any portions of the hollow core member which have not been completely vaporized during the molding procedure.

In another form of the invention shown in FIG. 4, it is noted that the hollow member 48 may be filled with a heat transfer liquid or other material which is statically retained therein during the molding process, rather than circulated as described. In one procedure, the volume 50 interior of the hollow member 48 is filled with a liquid which is operative to receive sufficient heat transferred through the wall of member 48 to prevent the destruction of said core member during the molding process. In another procedure, the liquid contained in volume 50 is operative to be vaporized from the heat transferred thereto to prevent the destruction of the hollow member 48. The resulting vapor may be passed through either or both passageways in the hollow conduit 51 during the molding procedure to remove same from the interior of member 48. In yet another procedure, the hollow member 48 may totally enclose a liquid preferably at a low enough temperature to receive enough heat from the molding material to prevent destruction of the hollow member 48 or to produce a hollow molding of predetermined characteristics. In this connection, expansion of the liquid or vapor generated within the member 48 may be such as to maintain the shape of the core member during the molding or to expand same a predetermined degree.

In yet another procedure, material filling volume 50 within the hollow member 48 may be such as to support said hollow member sufficiently during the molding procedure to predetermine the shape of the inside wall of the material molded in the cavity but either or both the material of the hollow member 48 and the liquid contained within the cavity 50 may be operative to be vaporized by the heat and removed from the interior of the casting or molding during the molding procedure. The core member 48 may thus comprise a hollow body formed by blow molding a suitable resin to a shape having a wall thickness sufficient to provide the desired results.

In another form of the invention, it is noted that the molding material may comprise an uncured resin, such as a polyester resin or a monomer of a suitable resin, which molding material is either curable or convertible to a polymer by irradiating same with suitable radiation. Such irradiation may be effected by means of the apparatus described by applying a radioactive gas or liquid to the described hollow core member or tubes extending into the mold after the molding material has been admitted thereto and either flowing said radioactive gas or liquid continuously through the hollow member or tube or allowing same to be retained therein in a manner to cure and/or polymerize the molding material.

In FIG. 5 is shown a portion of a composite molding 60 in the shape of a panel assembly which may be formed by a modified form of the apparatus hereinabove described. A molding material 66 is cast on both sides of a core member 62 composed of a sheet of material having flat portions 65 with conduit shaped portions 63 interposed between said flat portions 63 interposed between said flat portions and made of the same material as the flat portions. The portions 63 define one or more passageways 64 extending through the sheet and operatively connectable at different portions of the edge of the panel to respective outlets and inlets for a heat transfer fluid for conducting heat towards or away from the panel. The materials 56 encapsulating the core sheet 62 may comprise any suitable castable material such as a resin, mortar, metal or ceramic material which is cast or molded in situ against both faces of the core sheet 62. Notations 61 and 67 refer to capping sheets disposed against the outer faces of the material 66. Said capping sheets may comprise metal, plastic or ceramic material, depending on the composition of the composite panel and its intended use.

If the composite article 60 is to be utilized as a panel for conducting fluid through the passageways 64 at high pressure, a plurality of headed fasteners 69, such as rivets, may extend through the panel and through those portions 65 of the core member 62 which do not contain the conduits 63 so as to clampingly secure the composite panel together by engaging opposite faces of the capping sheets 61 and 67.

I claim:

1. A method of molding hollow articles comprising:
    predeterminately positioning a hollow core member within the cavity of a mold,
    disposing molten molding material in said mold cavity at an elevated temperature above the melting point of the core member,
    simultaneously with the introduction of said molding material into said mold cavity, flowing a heat transfer fluid through said hollow core member to receive and dissipate sufficient heat to prevent said core member from melting,
    allowing said molding material to set within said mold cavity,
    terminating the flow of said heat transfer fluid through said hollow core member,
    permitting the heat remaining in said molding material to be transferred to said core member so as to melt the material of said core member, and said molding material of said core member, and
    thereafter removing the melted material of said core member from the interior of the shape molded within said mold.

2. A method in accordance with claim 1 wherein the heat remaining in the molding material is operable to vaporize the material of the core member after the flow of said heat transfer fluid through said core member is terminated.

3. A method in accordance with claim 1 wherein said heat transfer fluid is also operative to support the walls of the core member against buckling during the molding procedure.

4. A method in accordance with claim 1 including the further step of flowing a second fluid through the interior of the hollow molding defined by the core member to remove core material remaining therein.

* * * * *